United States Patent [19]

Bouyanov et al.

[11] Patent Number: 5,604,173
[45] Date of Patent: Feb. 18, 1997

[54] DESULFURIZATION OF SULFUR COMPOUND-CONTAINING GASES WITH VANADIUM CATALYSTS

[75] Inventors: Roman A. Bouyanov, Novossibirsk; Albert M. Tsyboulesky, Moscou; Boris P. Zolotovsky; Dimitri P. Klevtsov, both of Novossibirsk; Vladimir L. Mourine, Moscou, all of Russian Federation

[73] Assignees: Institut De Catalyse Du Departmment Siberien De L'Academie Des Sciences De Russie, Novossibirik; Vniigaz, Razvilka, both of Russian Federation

[21] Appl. No.: 463,763

[22] Filed: Jun. 5, 1995

Related U.S. Application Data

[62] Division of Ser. No. 288,750, Aug. 16, 1994, Pat. No. 5,512,258, which is a division of Ser. No. 899,912, Jun. 17, 1992, Pat. No. 5,369,076.

[30] Foreign Application Priority Data

Jun. 17, 1991 [SU] U.S.S.R. .................................. 4941760

[51] Int. Cl.⁶ ...................................................... B01J 23/22
[52] U.S. Cl. ........................... 502/354; 502/217; 502/247; 502/304; 502/340; 502/341; 502/342; 502/343; 502/527
[58] Field of Search .................................. 502/354, 217, 502/247, 304, 340, 341, 342, 343, 527

[56] References Cited

U.S. PATENT DOCUMENTS

| | | | |
|---|---|---|---|
| 4,010,238 | 3/1977 | Shiraishi et al. | 423/239 |
| 4,550,098 | 10/1985 | Gens | 502/324 |
| 4,849,392 | 7/1989 | Hums et al. | 502/216 |
| 5,002,654 | 3/1991 | Chin | 502/42 |
| 5,043,309 | 8/1991 | Najjar et al. | 502/353 |
| 5,077,260 | 12/1991 | Muan et al. | 502/340 |
| 5,094,992 | 3/1992 | Najjar et al. | 502/247 |
| 5,369,076 | 11/1994 | Bouyanov et al. | 502/354 |
| 5,512,258 | 4/1996 | Bouyanov et al. | 423/230 |

FOREIGN PATENT DOCUMENTS 2614307  10/1977  Germany.

*Primary Examiner*—Michael Lewis
*Assistant Examiner*—Thomas G. Dunn, Jr.
*Attorney, Agent, or Firm*—Burns, Doane, Swecker & Mathis, L.L.P.

[57] ABSTRACT

Particular mixed vanadium/other metal catalysts, well suited for the desulfurization of gaseous effluents containing contaminating amounts of objectionable sulfur compounds, typically via the Claus reaction and notably in the presence of oxygen, comprise a support substrate, e.g., titanium dioxide, having an active catalytic phase deposited thereon, such active catalytic phase being constituted of an electroneutral solid solution having the average composition:

$$A_{4\pm y}V_{2\pm x}O_9$$

in which A is a metal other than vanadium, e.g., magnesium, calcium or zinc, $0 \leq x \leq 0.2$ and $0 \leq y \leq 0.5$.

2 Claims, No Drawings

DESULFURIZATION OF SULFUR COMPOUND-CONTAINING GASES WITH VANADIUM CATALYSTS

This application is a divisional, of application Ser. No. 08/288,750, filed Aug. 16, 1994, now U.S. Pat. No. 5,512,250, which is a divisional of application Ser. No. 07/899,912, filed Jun. 17, 1992, now U.S. Pat. No. 5,369,076.

BACKGROUND OF THE INVENTION

1. Field of the Invention

The present invention relates to novel vanadium catalysts particularly well suited for the desulfurization of gases containing sulfur compounds and to a process for the preparation thereof. This invention also relates to a process for the treatment of gases, notably industrial gaseous effluents, containing objectionable sulfur compounds, to eliminate such sulfur compounds therefrom, especially via the Claus reaction, wherein the sulfur values are recovered in the presence of such catalysts and, in particular, of oxygen.

2. Description of the Prior Art

In the conventional Claus process, to which the present invention is not limited, sulfur is recovered from gases containing hydrogen sulfide in two stages. In a first stage, the hydrogen sulfide is burned in the presence of a regulated amount of air to convert a portion of the gas into sulfur dioxide. Then, in a second stage, the gaseous mixture obtained is conveyed into reactors in series containing a catalyst, over which the Claus reaction is carried out:

$$2H_2S + SO_2 \rightarrow 3/n S_n + 2H_2O$$

Numerous catalysts have been employed for this reaction. Thus, it has long been known to use an alumina-based catalyst therefor, such as described in French Patent No. 1,570,161. A mixture of titanium dioxide and alumina has also been described for such purpose (U.S. Pat. No. 4,141,962).

For reactions of this type, it too is known to this art to use catalysts which, other than alumina, contain vanadium oxide.

One of the disadvantages of the above catalysts is their instability relative to oxygen. Thus, when the gaseous effluent to be treated contains minor amounts of oxygen, such catalysts may be relatively rapidly deactivated, e.g., as a result of the sulfatation of their face surfaces. Their catalytic activity can then be irreversibly diminished.

A catalyst containing titanium dioxide deposited onto silica, or a catalyst based on titanium dioxide incorporating, as additives therefor, alkaline earth metal sulfates (U.S. Pat. No. 4,485,189), can also be used for such purpose. However, these catalysts also exhibit a lower activity during the treatment of oxygen-containing gases. Thus, it is important that the catalyst retain a satisfactory degree of activity in the presence of oxygen, because the industrial gases to be treated often contain small quantities thereof.

SUMMARY OF INVENTION

Accordingly, a major object of the present invention is the provision of novel catalysts, particularly for the desulfurization of gases (e.g., industrial gases) containing objectionable sulfur compounds, and characteristically having a high activity during the Claus reaction and substantially maintaining such activity during said Claus reaction in the presence of oxygen, particularly in the event of the utilization of short contact times.

Another object of this invention is the provision of a process for the production of such catalysts.

This invention also features a catalyst for treating gases containing sulfur compounds via the Claus reaction, typically in the presence of oxygen, as well as a process for the treatment of gases containing sulfur compounds, particularly via the Claus reaction, notably in the presence of oxygen.

Briefly, the present invention features novel catalysts comprising a support substrate and a supported active catalytic phase constituted by a solid solution having the average composition:

$$A_{4\pm y}V_{2\pm x}O_9$$

in which $0 \leq x \leq 0.2$ and $0 \leq y \leq 0.5$, with the proviso that x and y are such that the electroneutrality of $A_{4\pm y}V_{2\pm x}O_9$ is assured and A is a metallic element stabilizing the valency of the vanadium at +5.

DETAILED DESCRIPTION OF THE PREFERRED EMBODIMENTS OF THE INVENTION

More particularly according to the present invention, by "electroneutrality" is intended that the sum of the positive charges of the cations of element A and vanadium is equal to the sum of the negative charges borne by the oxygen atom.

Consistent herewith, A is a metallic element preferably selected from among calcium, magnesium and zinc, and more preferably is magnesium.

Preferably, the catalysts according to the invention are substantially free or devoid of the oxides of the element A, e.g., magnesium oxide, and vanadium pentoxide, the presence of which would reduce the activity of the subject catalysts, particularly during a Claus reaction in the presence of oxygen.

Thus, if y is greater than 0.5 and/or x is greater than 0.2, the free oxide of element A appears, e.g., free magnesium oxide, sulfates are deposited on the catalyst surface and the activity of the catalyst decreases and/or free vanadyl pentoxide is generated, which reduces the properties the catalyst.

In a preferred embodiment of the invention, the catalytically active, supported phase is a solid solution having the average composition $A_4V_2O_9$ and more preferably having the composition $Mg_4V_2O_9$.

In general, the amount of supported phase (constituted by a solid solution of average composition $A_{4\pm y}V_{2\pm x}O_9$) preferably ranges from 2% to 15% by weight based on the catalyst and the amount of support preferably ranges from 85% to 98% by weight, based on the catalyst.

The catalysts according to the present invention typically have a BET specific surface ranging from 5 to 250 m²/g and a total pore volume ranging from 0.5 to 0.80 cm³/g.

The support substrates comprising the catalysts according to the invention are advantageously based on at least one oxide, particularly selected from among aluminum oxide, titanium dioxide, zirconium oxide, cerium oxide and silica. Preferably, such supports comprise titanium dioxide, zirconium oxide or silica.

Titanium dioxide is the preferred support according to the present invention, particularly as a result of the better performance characteristics of the catalysts produced therefrom.

The support substrates can contain at least one additive, particularly an additive for enhancing the mechanical properties of the final catalyst. Exemplary such additives include aluminum oxide, aluminum hydroxide, aluminum sulfate, silica, aluminosilicates (particularly of the formulae $Al_2O_3.6SiO_2$ or $6Al_2O_3.SiO_2$), clays and sulfates of alkaline earth metals, such as barium, calcium, magnesium or strontium sulfates.

Thus, the support substrates comprising the catalysts according to the invention can contain 10% to about 100%, e.g., 10% to 99.5% by weight, of at least one oxide selected from among aluminum oxide, titanium dioxide, zirconium oxide, cerium oxide and silica, and 0% to 90%, e.g., 0.5% to 90% by weight, of at least one additive selected from among aluminum oxide, aluminum hydroxide, aluminum sulfate, silica, silicoaluminates, clays and sulfates of alkaline earth metals.

In another preferred embodiment of the invention, such additive comprises an aluminum oxide.

The support then comprises, e.g., 70% to 90% by weight of titanium dioxide and 10% to 30% by weight of an aluminum oxide.

In another preferred embodiment of the invention, such additive comprises an alkaline earth metal sulfate and more particularly calcium sulfate.

The support then comprises, e.g., 80% to 99% and preferably 80% to 90% by weight of titanium dioxide and 1% to 20%, preferably 10% to 20% by weight of an alkaline earth metal sulfate.

The support substrates according to this invention typically have a specific BET specific surface area ranging from 5 to 300 $m^2/g$ and a total pore volume ranging from 0.15 and 0.30 $cm^3/g$.

The catalysts according to the invention can be produced by depositing an active catalyst phase onto a support.

The catalysts are for example, produced by a process essentially consisting of impregnating appropriate support with a solution of a salt of the metallic element A and a vanadyl salt. The salts used are typically thermally decomposable.

The process according to the invention preferably comprises the following stages:

(1) impregnating the support with a solution of a soluble salt of the metallic element A and a soluble vanadyl salt;

(2) drying the impregnated support; and (3) optionally, calcining the dried support.

It is envisaged to repeat the stages (1), (2) and, optionally, (3) in respect of the same support after drying and optionally calcining it.

The solution of impregnation can also comprise a mixture of a solution of a soluble salt of the metallic element A and a solution of a soluble vanadyl salt, or a solution of one of the two salts into which the other salt has been introduced.

The salt concentration of the impregnation solution is selected as a function of the amount of solid solution to be deposited onto the support. The amount of absorbed impregnation solution is dependent on the absorption capacity of the support used.

The salt of the metallic element A is typically a nitrate, an oxalate, an acetate or an ammonium salt of said element. Similarly, the vanadyl salt is generally a vanadate of ammonium, acetate, oxalate or nitrate. Preferably, such salts are nitrates.

The conditions of impregnation are otherwise conventional to this art.

Prior to the impregnation stage, it is possible to add the at least one additive, as indicated above, to the support. This can be carried out by any appropriate process and, in particular, by impregnating the support with a solution of a precursor of said additive.

Moreover, prior to the impregnation stage, the support, optionally comprising an additive, is typically shaped and is optionally dried and/or calcined.

The shaping is conducted via any known procedure. Such shaping can produce articles having a variety of different shapes, e.g., spherical, cylindrical, in the form of solid or hollow extrudates, particularly having a cylindrical or polylobar profile, shaped articles in the form of pellets, beads, granules, rings, monoliths and more particularly honeycombs. Especially preferred shaped articles include solid or hollow extrudates and monoliths.

The support substrates according to the present invention can be prepared by any appropriate, known process. Thus, when the support is titanium dioxide, the latter can, in particular, be provided by a conventional process of sulfuric acidulation of ilmenite after hydrolysis, filtration and optionally drying.

This invention also features the use of the catalysts described above for the treatment of gases and, in particular, industrial gaseous effluents, containing sulfur compounds, particularly hydrogen sulfide and sulfur dioxide, to eliminate such sulfur compounds therefrom via the Claus reaction, notably in the presence of oxygen, which may comprise such gases.

The present invention also features the treatment of gases, e.g., industrial gaseous effluents, containing sulfur compounds, particularly hydrogen sulfide and sulfur dioxide, to eliminate said sulfur compounds therefrom, particularly via the Claus reaction, wherein the catalysts described above are employed therefor. The Clause reaction can be carried out in the presence of oxygen, which can emanate from said gases.

The oxygen content of the gases to be treated can be up to 5% by volume, ranging, e.g., from 0.5% to 4% by volume and preferably from 1.5% to 3.5% by volume.

When the gases to be treated also contain organosulfur compounds, such as $CS_2$ and/or COS, the catalysts are well suited to eliminate same via the hydrolysis thereof.

The catalysts according to the invention can be analyzed by means of $^{51}V$ nuclei NMR spectra.

In the event that A is magnesium and the support is titanium dioxide, the spectrum obtained differs clearly from that of vanadium pentoxide supported by titanium dioxide and is characteristic of the product represented by the supported phase of a catalyst according to the invention.

In order to further illustrate the present invention and the advantages thereof, the following specific examples are given, it being understood that same are intended only as illustrative and in nowise limitative.

EXAMPLE 1

(According to the invention)

(1) A calcium nitrate aqueous solution was added to a titanium dioxide suspension obtained after the hydrolysis and filtration of a titanyl sulfate solution prepared by the standard technique of sulfuric acidulation of ilmenite. This suspension contained sulfate ions in an amount such that the weight ratio $SO_4^{2-}/TiO_2$ was 0.08 and the weight ratio $Ca^{2+}/TiO_3$ was 0.33.

The suspension was dried at 150° C. for one hour. The powder obtained was mixed with water for 2 hours. The resulting paste was extruded through a spinneret to produce extrudates, which were then dried at 110° C. for one hour and calcined at 400° C. for one hour. The thus prepared extrudates constituted a support containing 86.4% by weight titanium dioxide and 13.6% by weight calcium sulfate and had a specific BET surface of 120 $m^2/g$, a total pore volume of 0.36 $cm^3/g$ and an absorption capacity of 0.35 ml/g.

(2) 19.3 kg of the above extrudates were impregnated with 6.77 liters of an aqueous solution containing a mixture of magnesium nitrate and vanadyl nitrate. This impregnation solution was prepared by dissolving 2.06 kg of magnesium nitrate ($Mg(NO_3)_2.6H_2O$) in 3.90 liters of a 25% vanadyl nitrate solution (VO(NO$_3$)$_3$), followed by the addition of water until a volume of 6.77 liters was provided.

After impregnation, the extrudates were dried at ambient temperature for 24 hours and then calcined at 350° C. for 4 hours.

The catalyst produced had a specific surface of 90 m$^2$/g and a total pore volume of 0.33 cm$^3$/g. Its supported active phase content was 3.4% by weight, said phase being constituted by a solid solution of average composition Mg$_4$V$_2$O$_9$.

EXAMPLE 2

(According to the invention)

The operating procedure of Example 1 was repeated, but a catalyst having a supported active phase content of 2.0% by weight was produced, said active phase having the same composition as the catalyst of Example 1.

EXAMPLE 3

(According to the invention)

The operating procedure of Example 1 was repeated, but a catalyst having a supported active phase content of 15.0% by weight was produced, said active phase having the same composition as the catalyst of Example 1.

EXAMPLE 4

(According to the invention)

19 kg of extrudates prepared upon completion of phase (1) of Example I were impregnated with 6.67 liters of an aqueous solution containing a mixture of magnesium nitrate and vanadyl nitrate. This impregnation solution was prepared by dissolving 2.62 kg of magnesium nitrate (Mg(NO$_3$)$_2$.6H$_2$O) in 6.30 liters of a 25% vanadyl nitrate aqueous solution (VO(NO$_3$)$_3$), followed by the addition of water until a volume of 6.67 liters was provided.

After impregnation, the extrudates were dried at ambient temperature for 24 hours, followed by calcination at 350° C. for 4 hours.

The catalyst produced had a specific surface of 65 m$^2$/g and a total pore volume of 0.31 cm$^3$/g. Its supported active phase content was 5.0% by weight, said phase being constituted by a solid solution of average composition Mg$_{3.5}$V$_2$O$_9$.

EXAMPLE 5

(According to the invention)

19 kg of extrudates obtained upon completion of phase (1) of Example 1 were impregnated with 6.67 liters of an aqueous solution containing a mixture of magnesium nitrate and vanadyl nitrate. This impregnation solution was prepared by dissolving 3.34 kg of magnesium nitrate (Mg(NO$_3$)$_2$.6H$_2$O) in 5.07 liters of a 25% vanadyl nitrate aqueous solution (VO(NO$_3$)$_3$), followed by the addition of water until a volume of 6.67 liters was provided.

After impregnation, the extrudates were dried at ambient temperature for 24 hours, followed by calcination at 350° C. for 4 hours.

The catalyst produced had a specific surface of 80 m$^2$/g and a total pore volume of 0.32 cm$^3$/g. Its supported active phase content was 5.0% by weight, said phase being constituted by a solid solution of average composition Mg$_{4.5}$V$_{1.8}$O$_9$.

EXAMPLES 6 TO 14

(According to the invention)

Catalysts according to the invention were produced from known supports having different compositions, each of the supports containing a certain titanium dioxide proportion. These catalysts comprised a supported active phase constituted by a solid solution of average composition Mg$_4$V$_2$O$_9$. The catalysts were produced according to the procedure of phase (2) of Example 1, but a catalyst having a supported active phase content of 5.0% or 5.1% by weight was produced.

The composition of each of these catalysts is reported in Table 1.

EXAMPLE 15

(Comparative)

A prior art catalyst was prepared, containing titanium dioxide deposited onto silica. Its titanium dioxide and silica contents were, respectively, 15% and 85% by weight. Such catalyst can be prepared as described in British Patent No. 2,143,225.

EXAMPLE 16

(Comparative)

Another prior art catalyst was prepared containing calcium sulfate and titanium dioxide. Its calcium sulfate and titanium dioxide contents were, respectively, 13% and 87% by weight. Such catalyst can be prepared as described in U.S. Pat. No. 4,485,189.

EXAMPLE 17

Test of catalytic activity:

The catalysts of Examples 1 to 16 were tested in the Claus reaction, employing a fixed bed reactor and at a temperature of 220° C. Into such reactor was introduced a gaseous mixture containing, by volume, 3% H$_2$S, 1.6% SO$_3$, 30% H$_2$O and 65.4% N$_2$.

The gaseous mixture contact time was 0.08 seconds. The hydrogen sulfide degree of conversion was measured for the first 6 hours of operation. Then, to the initial reaction mixture were added varying amounts of oxygen (1% and 3% by volume, based on the initial reaction mixture volume) and the degree of hydrogen sulfide conversion was measured.

Analysis of the compositions of the initial gaseous mixture and the mixture exiting the reactor was by gas chromatography (e.g., using LXM-3MD and Gazochrom 2101 chromatographs). The results obtained are reported in Tables 1 and 2.

Displaying a very satisfactory activity for the Claus reaction, the catalysts according to the invention had an activity well above that of the prior art catalysts for the Claus reaction in the presence of oxygen.

EXAMPLE 18

(According to the invention)

5 kg of extrudates produced according to phase (1) of Example 1 were impregnated with 1.55 liters of an aqueous solution containing a mixture of zinc nitrate and vanadyl nitrate. This impregnation solution was prepared by dissolving 0.567 kg of zinc nitrate (Zn(NO$_3$)$_2$.6H$_2$O) in 0.904 liter of a vanadyl nitrate aqueous solution (VO(NO$_3$)$_3$) having a vanadium concentration of 68 g/liter. After impregnation, the extrudates were dried at ambient temperature for 24 hours, followed by calcination at 450° C. for 4 hours.

The supported active phase content of the catalyst produced was 5% by weight, said phase being constituted by a solid solution of average composition Zn$_{3.5}$V$_{2.2}$O$_9$.

EXAMPLE 19

(According to the invention)

The operating procedure of Example 4 was repeated, but using calcium nitrate ($Ca(NO_3)_2 \cdot 6H_2O$) instead of magnesium nitrate to produce a catalyst having a supported active phase content of 5% by weight, said phase being constituted by a solid solution of average composition $Ca_{3.5}V_{2.2}O_9$.

EXAMPLE 20

(According to the invention)

The operating procedure of Example 4 was repeated, but using as the support zirconium oxide extrudates instead of the extrudates prepared according to the technique of phase (1) of Example 1. The supported active phase content was 5% by weight, said phase being constituted by a solid solution of average composition $Mg_{3.5}V_{2.2}O_9$.

EXAMPLE 21

(According to the invention)

The operating procedure of Example 4 was repeated, but using as the support extrudates prepared solely from titanium dioxide. The supported active phase content of the catalyst produced was 5% by weight, said phase being constituted by a solid solution with an average composition $Mg_{3.5}V_{2.2}O_9$.

EXAMPLE 22

Test of catalytic activity:

The catalysts of Examples 4, 16 and 18 to 21 were tested in the Claus reaction employing a transverse reactor and a temperature of 220° C. Into such reactor was introduced a gaseous mixture having the following composition, by volume:

$H_2S$: 2%

$SO_2$: 1%

$H_2O$: 30%

$N_2$: 67%

The gaseous mixture contact time was 0.5 second. The degree of hydrogen sulfide conversion was measured for 6 hours of operation.

To the initial reaction mixture were then added varying amounts of oxygen (0.3% and 1% by volume, based on the volume of the initial reaction mixture) and the degree of hydrogen sulfide conversion was measured.

The analysis of the compositions of the initial gaseous mixture and the mixture exiting the reactor was by gas chromatography (e.g., using LXM-3MD and Gazachrom 2101 chromatographs).

The results obtained are reported in Tables 3 and 4.

As in Example 17, the catalysts according to the invention having a very satisfactory activity for the Claus reaction, displayed a higher activity than that of the prior art catalysts for the Claus reaction in the presence of oxygen.

TABLE 1

| | Catalyst | | | | | | |
|---|---|---|---|---|---|---|---|
| | Supported phase | | Support | | Degree of $H_2S$ conversion (%) | | |
| | Average | Content | $TiO_2$ content | Additive content | % by volume of $O_2$ | | |
| Example | composition | (wt. %) | (wt. %) | (wt. %) | 0 | 1.0 | 3.0 |
| 1 | $Mg_4V_2O_9$ | 3.4 | 86.4 | $CaSO_4$ 13.6 | 73 | 70 | 60 |
| 2 | $Mg_4V_2O_9$ | 2.0 | 86.4 | $CaSO_4$ 13.6 | 73 | 71 | 60 |
| 3 | $Mg_4V_2O_9$ | 15.0 | 86.4 | $CaSO_4$ 13.6 | 76 | 78 | 78 |
| 4 | $Mg_{3.5}V_{2.2}O_9$ | 5.0 | 86.4 | $CaSO_4$ 13.6 | 76 | 78 | 78 |
| 5 | $Mg_{4.5}V_{1.8}O_9$ | 5.0 | 86.4 | $CaSO_4$ 13.6 | 76 | 80 | 80 |
| 6 | $Mg_4V_2O_9$ | 5.0 | 10 | $Al_2O_3$ 90 | 73 | 70 | 65 |
| 7 | $Mg_4V_2O_9$ | 5.0 | 90 | AlOOH 10 | 77 | 75 | 75 |
| 8 | $Mg_4V_2O_9$ | 5.1 | 99.5 | $SiO_2$ 0.5 | 77 | 75 | 75 |
| 9 | $Mg_4V_2O_9$ | 5.1 | 90 | bentonite 10 | 76 | 76 | 75 |
| 10 | $Mg_4V_2O_9$ | 5.1 | 80 | $Al_2(SO_4)_3$ 20 | 75 | 75 | 74 |
| 11 | $Mg_4V_2O_9$ | 5.1 | 80 | $Al_2O_3 \cdot 6SiO_2$ 20 | 74 | 70 | 65 |
| 12 | $Mg_4V_2O_9$ | 5.1 | 80 | $6Al_2O_3 \cdot SiO_2$ 20 | 75 | 70 | 69 |
| 13 | $Mg_4V_2O_9$ | 5.1 | 80 | $BaSO_4$ 20 | 75 | 71 | 65 |
| 14 | $Mg_4V_2O_9$ | 5.1 | 15 | $SiO_2$ 83 | 74 | 75 | 75 |

TABLE 2

| Example | Catalyst Components content (wt. %) | | Degree of H$_2$S conversion (%) vol. % O$_2$ | | |
|---|---|---|---|---|---|
| | | | 0 | 1.0 | 3.0 |
| 15 | TiO$_2$ 15 | SiO$_2$ 85 | 73 | 60 | 39 |
| 16 | TiO$_2$ 87 | CaSO$_4$ 13 | 73 | 62 | 40 |

TABLE 3

| | Catalyst | | | | Degree of H$_2$S conversion (%) | | |
|---|---|---|---|---|---|---|---|
| | Supported phase | | Support | | % by volume of O$_2$ | | |
| Example | Average composition | Content (wt. %) | TiO$_2$ content (wt. %) | Additive content (wt. %) | 0 | 0.3 | 1.0 |
| 4 | Mg$_{3.5}$V$_{2.2}$O$_9$ | 5.0 | 86.4 | CaSO$_4$ 13.6 | 71 | 74 | 90 |
| 18 | Zn$_{3.5}$V$_{2.2}$O$_9$ | 5.0 | 86.4 | CaSO$_4$ 13.6 | 69 | 74 | 90 |
| 19 | Ca$_{3.5}$V$_{2.2}$O$_9$ | 5.0 | 86.4 | CaSO$_4$ 13.6 | 68 | 73 | 80 |
| 20 | Mg$_{3.5}$V$_{2.2}$O$_9$ | 5.0 | 0 ZrO$_2$ = 100 | 0 | 65 | 70 | 80 |
| 21 | Mg$_{3.5}$V$_{2.2}$O$_9$ | 5.0 | 100 | 0 | 71 | 75 | 88 |

TABLE 4

| Example | Catalyst Components content (wt. %) | | Degree of H$_2$S conversion (%) vol. % O$_2$ | | |
|---|---|---|---|---|---|
| | | | 0 | 0.3 | 1.0 |
| 16 | TiO$_2$ 87 | CaSO$_4$ 13 | 68 | 63 | 58 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a catalyst having an active catalytic phase deposited on a support substrate, said active catalytic phase comprising an electroneutral solid solution having an average composition:

$$A_{4\pm y}V_{2\pm x}O_9$$

in which A is a metal other than vanadium, $0 \leq x \leq 0.2$ and $0 \leq y \leq 0.5$, comprising impregnating said support substrate with a solution of a salt of said metal A and a vanadyl salt to thereby produce said catalyst.

2. The process as defined by claim 1 further comprising drying the impregnated support substrate and, optionally, calcining the dried, impregnated support substrate.

* * * * *